(12) United States Patent
Bernart

(10) Patent No.: US 8,061,730 B2
(45) Date of Patent: Nov. 22, 2011

(54) TRAILER RECEIVER LOCK

(75) Inventor: Francis Bernart, North Canton, OH (US)

(73) Assignee: Cequent Consumer Products, Solon, OH (US)

( * ) Notice: Subject to any disclaimer, the term of this patent is extended or adjusted under 35 U.S.C. 154(b) by 187 days.

(21) Appl. No.: 12/455,907

(22) Filed: Jun. 9, 2009

(65) Prior Publication Data

US 2010/0072729 A1 Mar. 25, 2010

Related U.S. Application Data

(60) Provisional application No. 61/131,415, filed on Jun. 9, 2008.

(51) Int. Cl.
*B60D 1/60* (2006.01)
(52) U.S. Cl. ................... 280/507; 70/39; 70/40
(58) Field of Classification Search ............... 70/39, 40; 280/504, 506, 507
See application file for complete search history.

(56) References Cited

U.S. PATENT DOCUMENTS

| | | | |
|---|---|---|---|
| 2,066,393 A * | 1/1937 | Dials | 70/39 |
| 5,823,021 A * | 10/1998 | Chang | 70/38 A |
| 5,950,461 A * | 9/1999 | Tsai | 70/38 A |
| 6,364,339 B1 | 4/2002 | Lee | |
| 6,412,315 B1 | 7/2002 | Cheng et al. | |
| 6,543,260 B2 | 4/2003 | Koy et al. | |
| 6,722,686 B2 | 4/2004 | Koy | |
| 7,040,646 B2 | 5/2006 | Pare | |
| 7,121,121 B2 * | 10/2006 | Wyers | 70/14 |
| 7,204,508 B1 * | 4/2007 | Hsai | 280/507 |
| 7,338,065 B1 * | 3/2008 | Clausen | 280/507 |
| 7,448,236 B2 * | 11/2008 | Recknagel et al. | 70/34 |
| 2006/0150691 A1 * | 7/2006 | Truss | 70/39 |
| 2008/0093823 A1 * | 4/2008 | Pratchler | 280/507 |

* cited by examiner

*Primary Examiner* — Kevin Hurley
*Assistant Examiner* — Marc Scharich
(74) *Attorney, Agent, or Firm* — McDonald Hopkins LLC

(57) ABSTRACT

The present invention is directed to a trailer receiver lock for locking a trailer hitch to prevent unauthorized use. An embodiment of the trailer receiver lock for locking a trailer hitch, wherein the trailer hitch includes a receiver and a hitch bar, may include a body including a locking mechanism and a pin member including a base. A first leg may extend from the base, wherein the first leg may include an end capable of insertion into an aperture in the receiver and an aperture in the hitch bar. A second leg may extending from the base, wherein the second leg may include an end capable of insertion into the body. The second leg may also include at least one engagement portion capable of engagement with the locking mechanism.

20 Claims, 4 Drawing Sheets

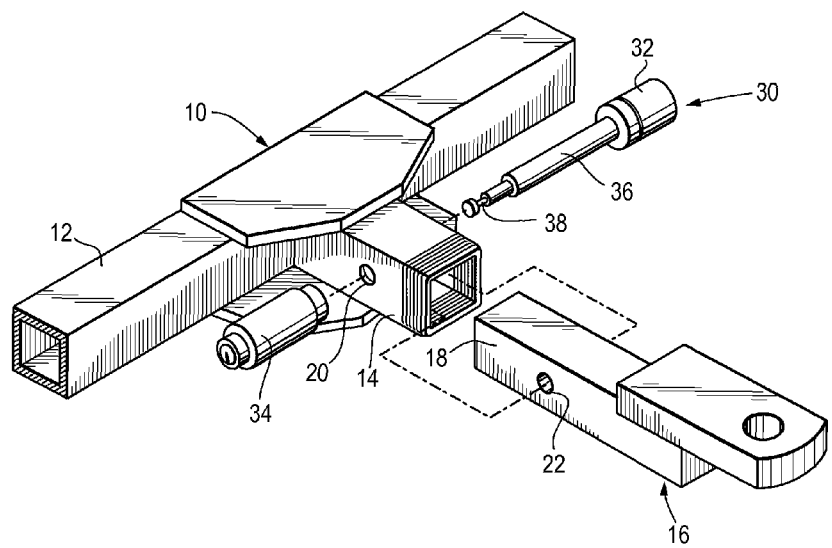
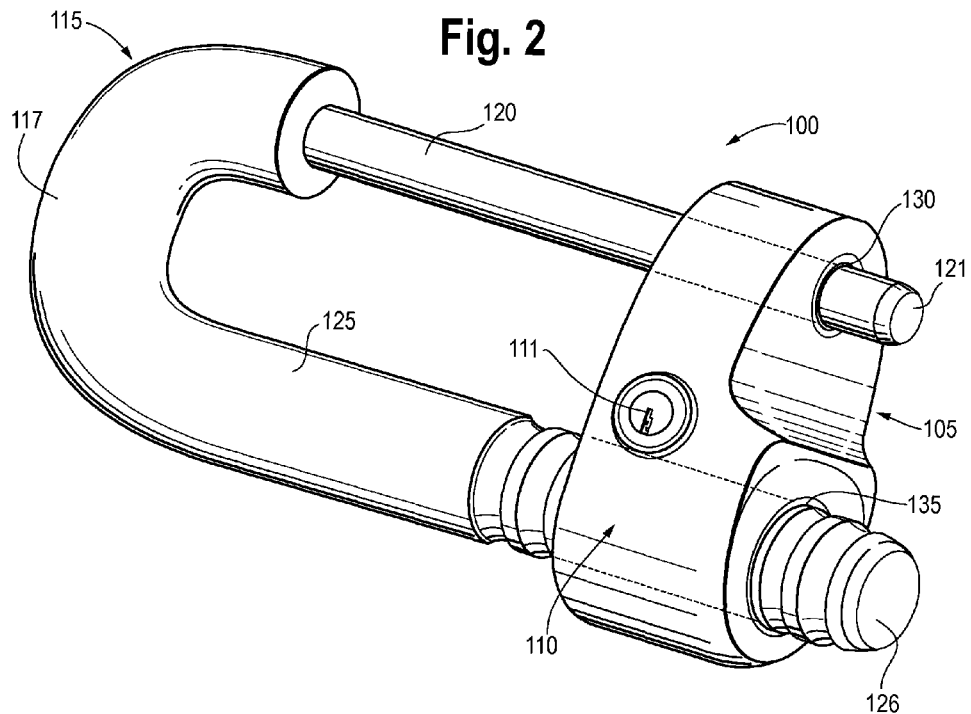

TRAILER RECEIVER LOCK

CROSS-REFERENCE TO RELATED APPLICATION

This application claims benefit from U.S. Provisional Patent Application No. 61/131,415, entitled "Trailer Receiver Lock," filed on Jun. 9, 2008, which is hereby incorporated in its entirety by reference.

FIELD OF INVENTION

The present invention relates generally to a lock, and more specifically, to a trailer receiver lock.

BACKGROUND

Historically, hitches mounted to a towing vehicle included fixed components permanently secured to the vehicle. The hitch body was bolted or welded to the vehicle and included a hitch ball fixed to the hitch structure. As hitch manufacturers developed more uses for their hitches, the fixed ball was replaced by a removable ball connected to a hitch bar that is inserted within a hitch receiver.

To prevent inadvertent removal of the hitch bar, a pin is inserted transversely through the hitch bar and receiver. Therefore, the hitch bar can be conveniently removed for interchange to a different insert associated with an accessory such as a cargo platform, bike carrier, ski rack, and the like. However, this freedom to interchange accessories also allows for unauthorized removal of the hitch bar from the receiver.

To prevent such unauthorized removal, various locks have been provided, such as the one described in U.S. Pat. No. 6,543,260 and illustrated in FIG. 1. As shown in FIG. 1, hitch assemblies 10 may include a crossbar 12 extending parallel to the rear of the vehicle (not shown) and a receiver 14 secured to and extending perpendicular to the crossbar 12. The receiver 14 typically has a square cross-sectional configuration. The receiver 14 is adapted to receive an insert such as a hitch bar 16. To prevent withdrawal of the hitch bar 16 from the receiver 14 during transport, the receiver 14 and the male portion 18 of the hitch bar 16 include aligned apertures 20, 22 through which a pin may be inserted.

As shown in FIG. 1, conventional receiver locks 34 typically utilize a pin 30 having an enlarged end portion 32, and an intermediate pin section 36 configured to fit through the apertures 20, 22. The end portion 32 prevents the pin 30 from passing through the apertures 20, 22. The free end of the pin 36 includes a groove 38 that is capable of being engaged by a lock assembly 34 to prevent unauthorized removal of the hitch bar 16 from the receiver 14.

As shown in FIG. 1, the groove 38 has a smaller diameter than the intermediate section 36 and the end portion 32. Accordingly, application of a sharp force to the lock assembly can shear the weaker groove 38 of the pin 30. Therefore, the pin 30 can be removed and the hitch insert 18, along with anything connected to it, may be disconnected from the receiver 14.

Therefore, a need exists for an improved trailer receiver lock. Further, a need exists for a trailer receiver lock that provides increased strength.

BRIEF DESCRIPTION OF THE DRAWINGS

Objects and advantages together with the operation of the invention may be better understood by reference to the following detailed description taken in connection with the following illustrations, wherein:

FIG. 1 illustrates an exploded view of conventional trailer receiver lock.

FIG. 2 illustrates a perspective view of a trailer receiver lock in an embodiment in accordance with the present invention.

SUMMARY OF INVENTION

The present invention is directed to an apparatus for locking a trailer hitch to prevent unauthorized use. An embodiment of the trailer receiver lock may include a body and a pin member. The body may include a first aperture and a second aperture. The pin member may include a first leg and a second leg, wherein the pin member may be capable of engagement with the apertures of the body. The trailer receiver lock may also include a locking mechanism that may be located with the body. The pin member may include an engagement portion that may be capable of engagement with the locking mechanism.

An embodiment of a trailer receiver lock for locking a trailer hitch, wherein the trailer hitch includes a receiver and a hitch bar, may include a body including a locking mechanism and a pin member including a base. A first leg may extend from the base, wherein the first leg may include an end capable of insertion into an aperture in the receiver and an aperture in the hitch bar. A second leg may extending from the base, wherein the second leg may include an end capable of insertion into the body. The second leg may also include at least one engagement portion capable of engagement with the locking mechanism.

DETAILED DESCRIPTION

While the invention is described with reference to trailer receiver locks, it should be clear that the invention should not be limited to such uses or embodiments. The description herein is merely illustrative of such embodiments of the invention and in no way should limit the scope of the invention.

FIGS. 2-6 illustrate a trailer receiver lock 100 ("the receiver lock 100") in accordance with the present invention. As shown in FIG. 2, the receiver lock 100 may include a body 105 and a pin member 115. The body 105 may include a locking mechanism 110. The body 105 may be of any appropriate shape or size and may be out of any appropriate material. The pin member 115 may be of any appropriate shape or size and may be made out of any appropriate material. The configuration of the pin member 115 overcomes the weak locking mechanism engagement point associated with conventional receiver locks.

Figure 3:
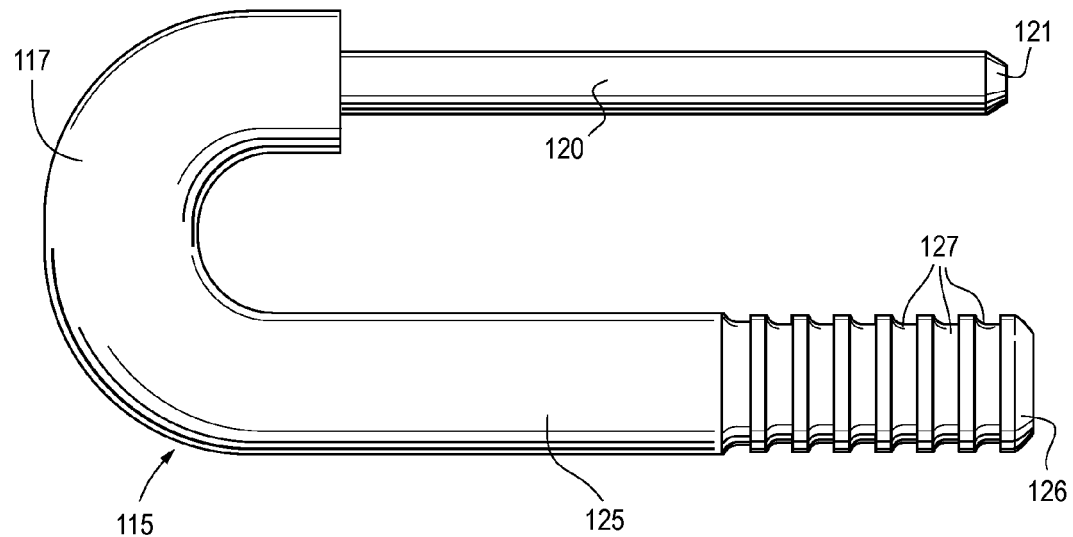
FIG. 3 illustrates a side view of a pin of the trailer receiver lock of FIG. 2.

As shown in FIG. 3, the pin member 115 may include a base 117. The base 117 may include a first leg 120 and a second leg 125. The first leg 120 and second leg 125 may extend therefrom. Although the pin member 115 may be shown as substantially U-shaped, it is to be understood that the pin member 115 may be provided in a variety of other shapes.

Figure 6:
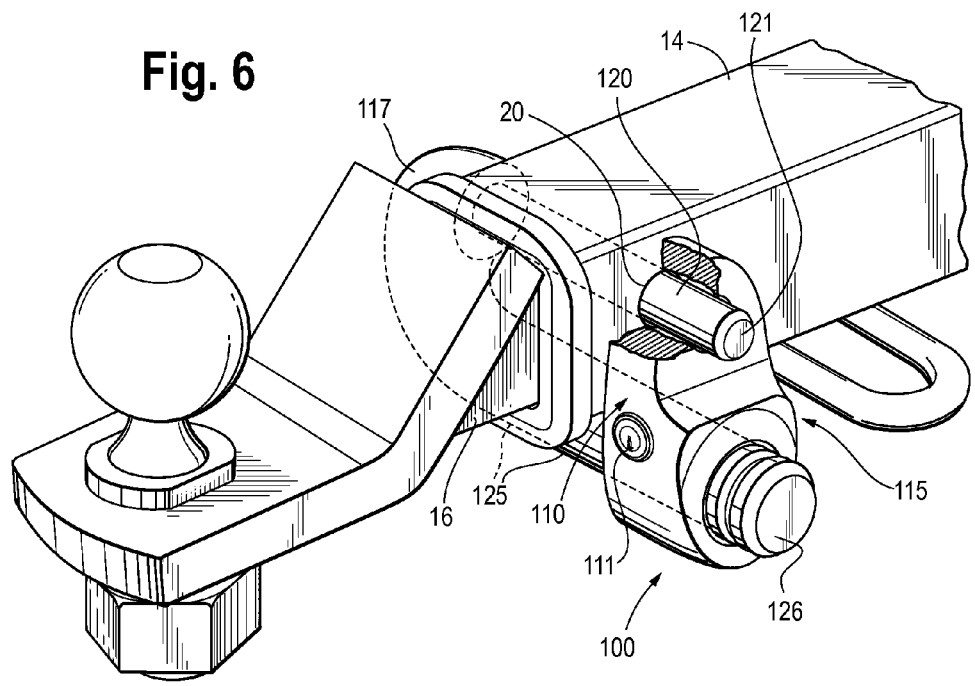
FIG. 6 illustrates a perspective view of the trailer receiver lock secured and installed on a trailer receiver in an embodiment.
Figure 7:
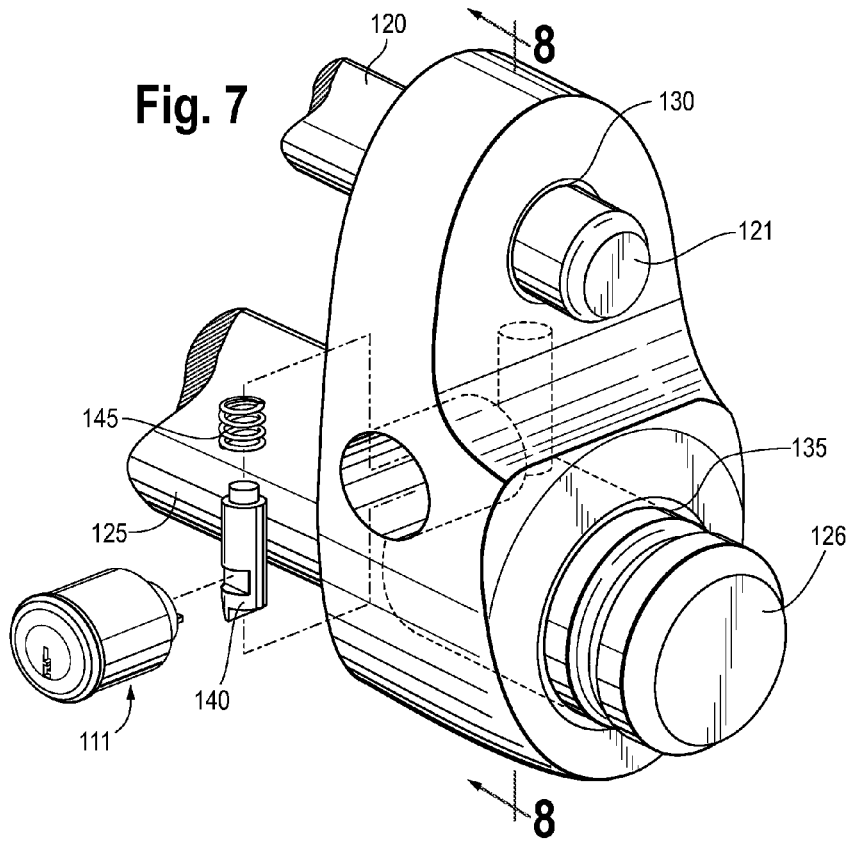
FIG. 7 is a partial perspective view of the trailer receiver lock with a release mechanism in an exploded view.
Figure 8:
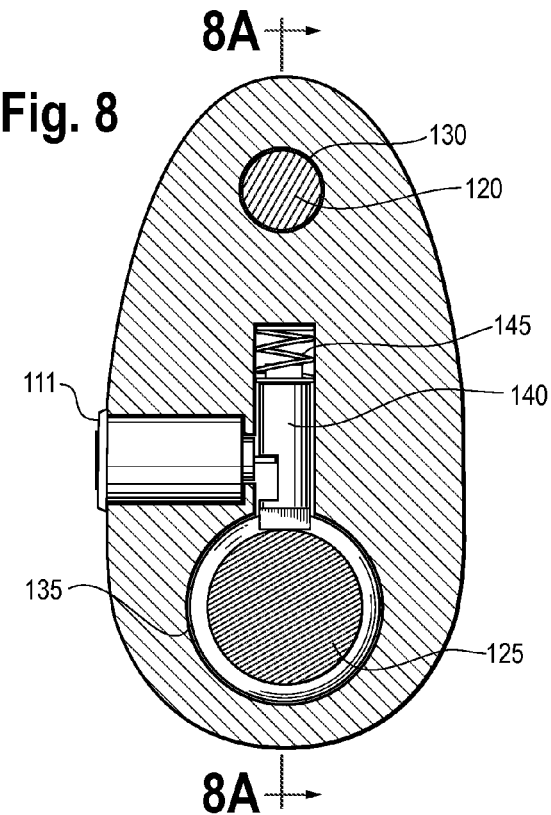
FIG. 8 is a cross-sectional view of the trailer receiver lock of FIG. 7 taken along lines 8-8.
Figure 8A:
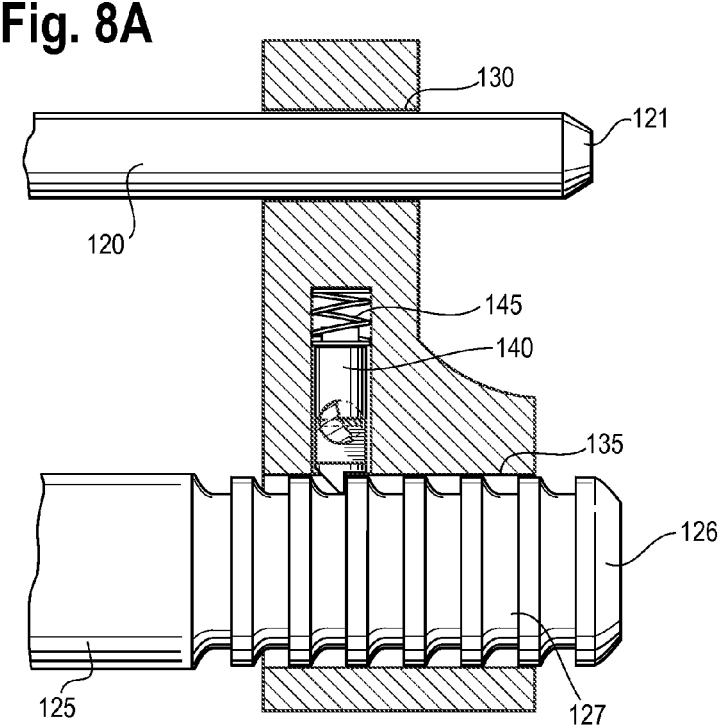
FIG. 8A is a cross-sectional view of the trailer receiver lock of FIG. 7.

With further reference to FIG. 3, the first leg 120 may include an end 121. The second leg 125 may include an end 126. The first leg 120 and the second leg 125 may be of any appropriate shape or size. As shown in FIG. 6, the end 121 of the first leg 120 may be capable of insertion through the apertures 20, 22 of the receiver 14 and the male portion 18 of the hitch bar 16. In a non-limiting example, the first leg 120 may have a diameter of ½" or ⅝".

Figure 4:
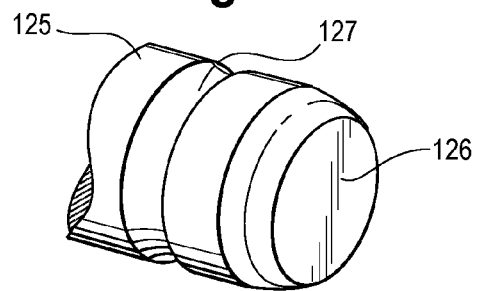
FIG. 4 illustrates a partial view of an engagement portion of a trailer receiver lock.

As shown in FIG. 6, the end 126 of the second leg 125 may be capable of insertion into the body 105. The second leg 125 may include an engagement portion 127. The engagement portion 127 may be utilized for engagement with the locking mechanism 110. As shown in FIG. 4, the engagement portion 127 may be of any appropriate shape, size or type, such as a groove or recess for engagement with a ball bearing (not shown) in the locking mechanism 110.

Figure 5:
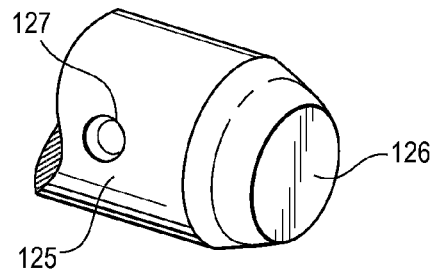
FIG. 5 illustrates another partial view of an engagement portion of a trailer receiver lock.

In another non-limiting illustrative example, as shown in FIG. 5, the engagement portion 127 may be a recess or an aperture extending through the second leg 125 for engagement with a bolt in the locking mechanism 110. While described with the second leg 125 including the engagement portion 127, it is to be understood that the first leg 120 may include the engagement portion 127 and/or both may include the engagement portion 127, and the invention should not be limited to that shown and described herein.

It is to be understood that the second leg 125 may be provided with more than one engagement portion 127. It is also to be understood that the engagement portion 127 may be located at any appropriate location(s) along the second leg 125. A series of engagement portions 127 may be provided along the length of the second leg 125 to, for example, accommodate a variety of different receiver sizes. It is to be understood, however, that the engagement portion 127 is not to be limited to the examples shown in FIGS. 4 and 5, as one of ordinary skill in the art will appreciate that the portion 127 may have numerous configurations for use with a variety of appropriate and different types of locking mechanisms 110.

The pin member 115 may be provided with sufficient clearance between the first leg 120 and the second leg 125 to allow the second leg 125 to extend around the receiver 14, as best shown in FIG. 6. In a non-limiting example, about 1.5" of clearance may be provided between the first leg 120 and the second leg 125. Therefore, unlike conventional locks the diameter of the engagement portion 127 is not limited by the size of the apertures 20, 22 in the receiver 14 and hitch bar 16 and may be capable of withstanding greater impact forces than prior art locks. In a non-limiting example, the diameter of the engagement portion 127 may be at least about the same as the diameter of the receiver aperture 20 and hitch bar aperture 22. In another non-limiting example, the diameter of the engagement portion may be about 1". It is to be understood that the diameter of the engagement portion 127 may be of any appropriate shape or size and should not be limited to those described herein.

As shown in FIG. 2, the body 105 may include a first aperture 130. The first aperture 130 may be of any appropriate shape or size, such as being sized to receive the first leg 120. The body 105 may include a second aperture 135. The second aperture 135 may be of any appropriate shape or size. The second aperture 135 may be sized to receive the second leg 125. Although the first aperture 130 and the second aperture 135 are shown as extending through the body 105, it is to be understood that that first aperture 130 and the second aperture 135 may extend through only a portion of the body 105.

The body 105 may also include a locking mechanism 110. The locking mechanism 110 may be of any appropriate shape, size, or type. The locking mechanism 110 may be capable of engaging the engagement portion 127 to prevent disengagement of the pin member 115 from the body 105. As described above with respect to FIGS. 4 and 5, the locking mechanism 110 may include a ball bearing or bolt (not shown) capable of engaging the engagement portion 127 in a locked position. The ball bearing or bolt 140 may be spring biased, such as by spring 145, to automatically engage the engagement portion 127 upon the insertion of end 126 in aperture 135, thereby preventing withdrawal of the second leg 125 from the aperture 135.

As shown in FIG. 2, the locking mechanism 110 may be provided with a release mechanism 111. The release mechanism 111 may be provided with a keyway (not shown) capable of receiving an object (not shown), such as a key or coin, to release the locking mechanism 110. Therefore, only users with the object may remove the receiver lock 100 from the hitch receiver 14. It is to be understood, however, that the release mechanism 111 should not be limited to those described herein, as one of ordinary skill in the art will appreciate that a variety of release mechanisms may provided.

Turning to the receiver lock 100, an example of a method of using the receiver lock 100, as illustrated in FIGS. 2 through 6, is set forth below. As shown in FIG. 3, the pin member 115 may be separated from the body 105. Referring to FIG. 6, the end 121 of the first leg 120 may be inserted through the coaxially aligned apertures 20, 22 of the receiver 14 and hitch bar 16.

The body 105 may be aligned with the pin member 115. Once aligned, the first leg 120 may be inserted in the aperture 130 and the second leg 125 may be inserted into the aperture 135, as shown in FIG. 6. The locking mechanism 110 may engage the engagement portion 127 as it enters the aperture 135 to prevent withdrawal of the first leg 120 from the aperture 130 and to prevent withdrawal of the second leg 125 from the aperture 135. Accordingly, the hitch bar 16 cannot be removed from the receiver 14 and the male portion 18 of the hitch bar 16.

In order to remove the pin member 115 from the body 105, a key may be inserted in the release mechanism 111 and rotated to disengage the locking mechanism 110 from the engagement portion 127. Accordingly, the second leg 125 may be withdrawn from aperture 135 and the first leg 120 may be withdrawn from the body aperture 130, the hitch bar apertures 22, and the receiver apertures 20, allowing for removal of the hitch bar 16 from the receiver 14.

Although the preferred embodiment of the present invention has been illustrated in the accompanying drawing and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, I claim:

1. A trailer receiver lock comprising:
    a body including a first aperture and a second aperture, wherein said first and second apertures are of different sizes;
    a pin member including a first leg and a second leg, wherein said pin member is capable of passing through at least part of a trailer hitch receiver for engagement with said apertures of said body;

a locking mechanism located within said body; and
wherein said pin member includes an engagement portion capable of engagement with said locking mechanism.

2. The trailer receiver lock of claim 1, wherein said engagement portion is an aperture extending through said second leg and capable of engagement with said locking mechanism.

3. The trailer receiver lock of claim 2, wherein said locking mechanism includes a bolt capable of engaging said engagement portion in a locked position.

4. The trailer receiver lock of claim 3, wherein said bolt is spring biased to automatically engage said engagement portion upon insertion of said pin member in said body.

5. The trailer receiver lock of claim 1, wherein said pin member is substantially U-shaped.

6. The trailer receiver lock of claim 5, wherein said locking mechanism is capable of engaging said engagement portion to prevent disengagement of said pin member from said body.

7. The trailer receiver lock of claim 6, wherein said locking mechanism includes a release mechanism.

8. The trailer receiver lock of claim 5, wherein said first aperture is capable of receiving said first leg and said second aperture is capable of receiving said second leg.

9. The trailer receiver lock of claim 5, wherein said engagement portion is a circumferential groove capable of engagement with said locking mechanism.

10. The trailer receiver lock of claim 1, wherein said pin member is completely removable from said body and either of said first and second legs is removable from said body when the other of said first and second legs is held within said body.

11. A trailer receiver lock for locking a trailer hitch, wherein the trailer hitch includes a receiver and a hitch bar, said trailer receiver lock comprising:
 a body including a locking mechanism;
 a pin member including a base;
 a first leg extending from said base, said first leg having a first diameter, wherein said first leg includes an end capable of insertion into an aperture in the receiver and an aperture in the hitch bar;
 a second leg extending from said base, said second leg having a second diameter, wherein said second leg includes an end capable of insertion into said body; and
 wherein said second leg includes at least one engagement portion capable of engagement with said locking mechanism and wherein said second diameter is greater than said first diameter.

12. The trailer receiver lock of claim 11, wherein said body includes a first aperture for receiving said first leg and a second aperture for receiving said second leg.

13. The trailer receiver lock of claim 12, wherein said locking mechanism includes a release mechanism.

14. The trailer receiver lock of claim 13, wherein said release mechanism includes a keyway capable of receiving an object to release said locking mechanism.

15. The trailer receiver lock of claim 11, wherein said pin member includes clearance between said first leg and said second leg to allow said second leg to extend around the receiver.

16. The trailer receiver lock of claim 15, wherein said trailer receiver lock includes approximately 1.5 inches of clearance between said first leg and said second leg.

17. The trailer receiver lock of claim 11, further including a series of engagement portions provided along said second leg to accommodate a variety of different receiver sizes.

18. A trailer hitch comprising:
 a receiver having at least one aperture;
 a hitch bar attached to said receiver, said hitch bar having at least one aperture;
 a trailer receiver lock capable of selectively securing said hitch bar to said receiver, said trailer receiver lock comprising:
  a body having first and second openings;
  a pin member having first and second legs, said first leg having a diameter larger then a diameter of said second leg, wherein said second leg is capable of insertion through said at least one apertures of said receiver and hitch bar and through said second opening of said body;
  an engagement portion positioned on said first leg;
  a locking mechanism located within said body, said locking mechanism capable of engaging said engagement portion of said first leg when said first leg is inserted through said first opening of said body.

19. The trailer hitch assembly of claim 18, wherein said pin member includes a shoulder located adjacent said first and second legs.

20. The trailer hitch assembly of claim 19, wherein said shoulder is in close proximity to either of said first or second openings.

* * * * *